(12) United States Patent
Shahana

(10) Patent No.: US 11,124,266 B2
(45) Date of Patent: Sep. 21, 2021

(54) HUMAN-POWERED VEHICLE CONTROL DEVICE

(71) Applicant: Shimano Inc., Osaka (JP)

(72) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 280 days.

(21) Appl. No.: 16/362,771

(22) Filed: Mar. 25, 2019

(65) Prior Publication Data

US 2019/0300103 A1 Oct. 3, 2019

(30) Foreign Application Priority Data

Mar. 29, 2018 (JP) .............................. JP2018-066077

(51) Int. Cl.
| | | |
|---|---|---|
| *B62M 6/45* | (2010.01) | |
| *B62M 9/123* | (2010.01) | |
| *B62M 9/122* | (2010.01) | |
| *B62M 6/90* | (2010.01) | |

(52) U.S. Cl.
CPC .............. *B62M 6/45* (2013.01); *B62M 9/122* (2013.01); *B62M 9/123* (2013.01); *B62M 6/90* (2013.01)

(58) Field of Classification Search
CPC .......... B62M 6/45; B62M 6/90; B62M 9/122; B62M 9/123
See application file for complete search history.

(56) References Cited

U.S. PATENT DOCUMENTS

| | | | |
|---|---|---|---|
| 2016/0039496 A1* | 2/2016 | Hancock ................ | G01S 19/19 701/60 |
| 2016/0375958 A1 | 12/2016 | Hashimoto et al. | |
| 2017/0057596 A1* | 3/2017 | Ichida ..................... | B62M 6/50 |
| 2017/0073040 A1 | 3/2017 | Djakovic et al. | |
| 2018/0086417 A1* | 3/2018 | Baumgaertner ......... | B62M 6/55 |
| 2019/0250619 A1* | 8/2019 | Gillett .................. | H04W 76/14 |

FOREIGN PATENT DOCUMENTS

| | | |
|---|---|---|
| CN | 106275231 A | 1/2017 |
| CN | 106476973 A | 3/2017 |
| EP | 3 072 797 A1 | 2/2016 |

(Continued)

*Primary Examiner* — Hunter B Lonsberry
*Assistant Examiner* — Matthew J. Reda
(74) *Attorney, Agent, or Firm* — Global IP Counselors, LLP

(57) ABSTRACT

A human-powered vehicle control device includes an electronic controller that controls a human-powered vehicle component including at least one of a motor assisting in propulsion of a human-powered vehicle and a transmission changing a first ratio of a rotational speed of a drive wheel to a rotational speed of a crank of the human-powered vehicle. The electronic controller controls the human-powered vehicle component in a first control state and a second control state differing from the first control state. The electronic controller changes the first control state to the second control state upon determining a value related to a first change rate of an inclination angle of the human-powered vehicle is greater than or equal to a first predetermined value in the first control state. The inclination angle of the human-powered vehicle includes at least one of a yaw angle and a roll angle of the human-powered vehicle.

18 Claims, 10 Drawing Sheets

(56) References Cited

FOREIGN PATENT DOCUMENTS

| | | | | |
|---|---|---|---|---|
| EP | 3564109 A1 | * | 11/2019 | ............ B62M 6/50 |
| JP | 2001-280464 A | | 10/2001 | |
| JP | 5418512 B2 | | 2/2014 | |
| JP | 2017-7644 A | | 1/2017 | |
| JP | 2019-116241 A | | 7/2019 | |
| JP | 2019-137115 A | | 8/2019 | |
| TW | I545053 | * | 9/2015 | ............ B62K 19/40 |

* cited by examiner

HUMAN-POWERED VEHICLE CONTROL DEVICE

CROSS-REFERENCE TO RELATED APPLICATIONS

This application claims priority to Japanese Patent Application No. 2018-066077, filed on Mar. 29, 2018. The entire disclosure of Japanese Patent Application No. 2018-066077 is hereby incorporated herein by reference.

BACKGROUND

Technical Field

The present invention generally relates to a human-powered vehicle control device.

Background Information

For example, Japanese Laid-Open Patent Publication No. 2001-280464 describes a known human-powered vehicle control device. In a case in which a human-powered vehicle travels on a slope, the human-powered vehicle control device changes a control state of a human-powered vehicle component.

SUMMARY

The above human-powered vehicle control device considers only the road gradient. One object of the present disclosure is to provide a human-powered vehicle control device that appropriately controls a human-powered vehicle component.

A human-powered vehicle control device according to a first aspect of the present disclosure comprises an electronic controller that is configured to control a human-powered vehicle component including at least one of a motor that assists in propulsion of a human-powered vehicle and a transmission that changes a first ratio of a rotational speed of a drive wheel to a rotational speed of a crank of the human-powered vehicle. The electronic controller is configured to control the human-powered vehicle component in a first control state and a second control state that differs from the first control state. The electronic controller is configured to change the first control state to the second control state upon determining a value related to a first change rate of an inclination angle of the human-powered vehicle is greater than or equal to a first predetermined value in the first control state. The inclination angle of the human-powered vehicle includes at least one of a yaw angle of the human-powered vehicle and a roll angle of the human-powered vehicle.

With the human-powered vehicle control device according to the first aspect, the human-powered vehicle component including at least one of the motor and the transmission is appropriately controlled in a case in which at least one of the yaw angle and the roll angle of the human-powered vehicle quickly changes.

In accordance with a second aspect of the present disclosure, the human-powered vehicle control device according to the first aspect is configured so that the electronic controller is configured to change the second control state to the first control state upon determining a value related to the first change rate is less than a second predetermined value in the second control state.

With the human-powered vehicle control device according to the second aspect, in a case in which the change in at least one of the yaw angle and the roll angle of the human-powered vehicle is stabilized, the second control state is changed back to the first control state so that the human-powered vehicle component is controlled in the first control state.

In accordance with a third aspect of the present disclosure, the human-powered vehicle control device according to the first aspect is configured so that the electronic controller is configured to change the second control state to the first control state upon determining the inclination angle of the human-powered vehicle is less than a first angle in the second control state.

With the human-powered vehicle control device according to the third aspect, in a case in which the inclination angle of the human-powered vehicle is less than the first angle in the second control state, the second control state is changed back to the first control state so that the human-powered vehicle component is controlled in the first control state.

In accordance with a fourth aspect of the present disclosure, the human-powered vehicle control device according to the first aspect is configured so that the electronic controller is configured to change the second control state to the first control state upon determining where a pitch angle of the human-powered vehicle is less than a second angle in the second control state.

With the human-powered vehicle control device according to the fourth aspect, in a case where the pitch angle of the human-powered vehicle is less than the second angle in the second control state, the second control state is changed back to the first control state so that the human-powered vehicle component is controlled in the first control state.

In accordance with a fifth aspect of the present disclosure, the human-powered vehicle control device according to any one of the first to fourth aspects is configured so that the human-powered vehicle component includes the motor, and the electronic controller is configured to control the motor in accordance with human drive force input to the human-powered vehicle.

With the human-powered vehicle control device according to the fifth aspect, the motor is controlled in accordance with the first change rate of at least one of the yaw angle and the roll angle of the human-powered vehicle. The electronic controller is configured to control the motor in accordance with the human drive force. Thus, propulsion of the human-powered vehicle is appropriately assisted by the motor.

In accordance with a sixth aspect of the present disclosure, the human-powered vehicle control device according to the fifth aspect is configured so that the electronic controller is configured to control the motor so that a second ratio of an assist force generated by the motor to the human drive force in the second control state is smaller than the second ratio in the first control state.

With the human-powered vehicle control device according to the sixth aspect, in a case in which the first change rate of at least one of the yaw angle and the roll angle of the human-powered vehicle is large, the second ratio is smaller than in a case in which the first change rate is small. Thus, the behavior of the human-powered vehicle is readily stabilized.

In accordance with a seventh aspect of the present disclosure, the human-powered vehicle control device according to the sixth aspect is configured so that the electronic controller is configured to control the motor so as not to assist in propulsion of the human-powered vehicle in the second control state.

With the human-powered vehicle control device according to the seventh aspect, in a case in which the first change rate of at least one of the yaw angle and the roll angle of the human-powered vehicle increases, the motor is controlled so as not to assist in propulsion of the human-powered vehicle. Thus, the behavior of the human-powered vehicle is readily stabilized.

In accordance with an eighth aspect of the present disclosure, the human-powered vehicle control device according to the fifth or sixth aspect is configured so that the electronic controller is configured to control the motor so that an upper limit value of an output of the motor in the second control state is smaller than the upper limit value of the output of the motor in the first control state.

With the human-powered vehicle control device according to the eighth aspect, in a case in which the first change rate of at least one of the yaw angle and the roll angle of the human-powered vehicle increases, the upper limit value of output of the motor is decreased. Thus, the behavior of the human-powered vehicle is readily stabilized.

In accordance with a ninth aspect of the present disclosure, in the human-powered vehicle control device according to any one of the fifth to eighth aspects, the electronic controller is configured to control the motor in a third control state and a fourth control state that differs from the third control state. The electronic controller is configured to change the third control state to the fourth control state upon determining a pitch angle of the human-powered vehicle or a value related to a second change rate of the pitch angle of the human-powered vehicle is greater than or equal to a third predetermined value and the pitch angle of the human-powered vehicle increases in the third control state.

With the human-powered vehicle control device according to the ninth aspect, the motor is controlled in a case in which the pitch angle of the human-powered vehicle quickly increases.

In accordance with a tenth aspect of the present disclosure, the human-powered vehicle control device according to the ninth aspect is configured so that the electronic controller is configured to control the motor in the fourth control state so that a second ratio of an assist force generated by the motor to the human drive force in the fourth control state is larger than the second ratio in the third control state.

With the human-powered vehicle control device according to the tenth aspect, the assist force readily increases in a case in which the pitch angle of the human-powered vehicle quickly increases. Thus, for example, in a case in which the human-powered vehicle travels on rising steps, the human-powered vehicle easily travels over the steps.

In accordance with an eleventh aspect of the present disclosure, in the human-powered vehicle control device according to any one of the fifth to tenth aspects, the electronic controller is configured to control the motor in a fifth control state and a sixth control state that differs from the fifth control state. The electronic controller is configured to change the fifth control state to the sixth control state upon determining an absolute value of a value related to a second change rate of a pitch angle of the human-powered vehicle is greater than or equal to a fourth predetermined value and the pitch angle of the human-powered vehicle decreases in the fifth control state.

With the human-powered vehicle control device according to the eleventh aspect, the motor is appropriately controlled in a case in which the pitch angle of the human-powered vehicle quickly decreases.

In accordance with a twelfth aspect of the present disclosure, the human-powered vehicle control device according to the eleventh aspect is configured so that the electronic controller is configured to control the motor so that a second ratio of an assist force generated by the motor to the human drive force in the sixth control state is smaller than the second ratio in the fifth control state.

With the human-powered vehicle control device according to the twelfth aspect, in a case in which the pitch angle of the human-powered vehicle quickly decreases, the behavior of the human-powered vehicle is readily stabilized.

In accordance with a thirteenth aspect of the present disclosure, the human-powered vehicle control device according to the twelfth aspect is configured so that the electronic controller is configured to control the motor so as not to assist in propulsion of the human-powered vehicle in the sixth control state.

With the human-powered vehicle control device according to the thirteenth aspect, in a case in which the pitch angle of the human-powered vehicle quickly decreases, the motor is controlled so as not to assist in propulsion of the human-powered vehicle. Thus, the behavior of the human-powered vehicle is readily stabilized.

In accordance with a fourteenth aspect of the present disclosure, the human-powered vehicle control device according to any one of the first to thirteenth aspects is configured so that the human-powered vehicle component includes the transmission. The electronic controller is configured to control the transmission so that the first ratio in the second control state is smaller than the first ratio in the first control state.

With the human-powered vehicle control device according to the fourteenth aspect, in a case in which the first change rate of at least one of the yaw angle and the roll angle of the human-powered vehicle increases, the first ratio is decreased. Thus, the behavior of the human-powered vehicle is readily stabilized.

In accordance with a fifteenth aspect of the present disclosure, the human-powered vehicle control device according to any one of the first to fourteenth aspects is configured so that the human-powered vehicle component includes the transmission. The electronic controller is configured to control the transmission so as to change the first ratio in accordance with a travel state of the human-powered vehicle in the first control state and does not control the transmission in accordance with the travel state of the human-powered vehicle in the second control state.

With the human-powered vehicle control device according to the fifteenth aspect, in a case in which the first change rate of at least one of the yaw angle and the roll angle of the human-powered vehicle increases, the transmission is not controlled. Thus, the behavior of the human-powered vehicle is readily stabilized.

In accordance with a sixteenth aspect of the present disclosure, the human-powered vehicle control device according to the fifteenth aspect is configured so that the electronic controller is configured to control the transmission so as to change the first ratio upon determining a parameter related to a travel state of the human-powered vehicle shifts from within a predetermined range to outside the predetermined range in the first control state.

With the human-powered vehicle control device according to the sixteenth aspect, in the first control state, the first ratio is changed to a first ratio that is appropriate to the travel state of the human-powered vehicle.

In accordance with a seventeenth aspect of the present disclosure, the human-powered vehicle control device according to the sixteenth aspect is configured so that the parameter includes at least one of a rotational speed of a crank of the human-powered vehicle and human drive force input to the human-powered vehicle.

With the human-powered vehicle control device according to the seventeenth aspect, at least one of the rotational speed of the crank of the human-powered vehicle and the human drive force input to the human-powered vehicle is readily maintained in an appropriate range in the first control state.

In accordance with an eighteenth aspect of the present disclosure, the human-powered vehicle control device according to any one of the first to seventeenth aspects further comprises a detector that detects the inclination angle.

With the human-powered vehicle control device according to the eighteenth aspect, the inclination angle is appropriately detected by the detector.

In accordance with a nineteenth aspect of the present disclosure, the human-powered vehicle control device according to the eighteenth aspect is configured so that the detector includes a gyroscope.

With the human-powered vehicle control device according to the nineteenth aspect, the inclination angle is appropriately detected by the gyroscope.

In accordance with a twentieth aspect of the present disclosure, the human-powered vehicle control device according to the eighteenth or nineteenth aspect is configured so that the detector includes a mount that is mountable on a frame of the human-powered vehicle.

With the human-powered vehicle control device according to the twentieth aspect, the detector is mountable on the frame and detects the inclination angle of the human-powered vehicle.

The human-powered vehicle control device according to the present disclosure appropriately controls the human-powered vehicle component. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A first embodiment of a human-powered vehicle control device 40 will now be described with reference to FIGS. 1 to 7. In the description hereafter, the human-powered vehicle control device 40 is simply referred to as the control device 40. The control device 40 is provided on a human-powered vehicle 10. The human-powered vehicle 10 is a vehicle that can be driven by at least human drive force. The human-powered vehicle 10 includes, for example, a bicycle. The number of wheels on the human-powered vehicle 10 is not limited. The human-powered vehicle 10 includes, for example, a monocycle and a vehicle having three or more wheels. The human-powered vehicle includes, for example, various kinds of bicycles such as a mountain bike, a road bike, a city bike, a cargo bike, and a recumbent bike and an electric assist bicycle (E-bike). In the embodiments described below, the human-powered vehicle 10 refers to a bicycle.

Figure 1:
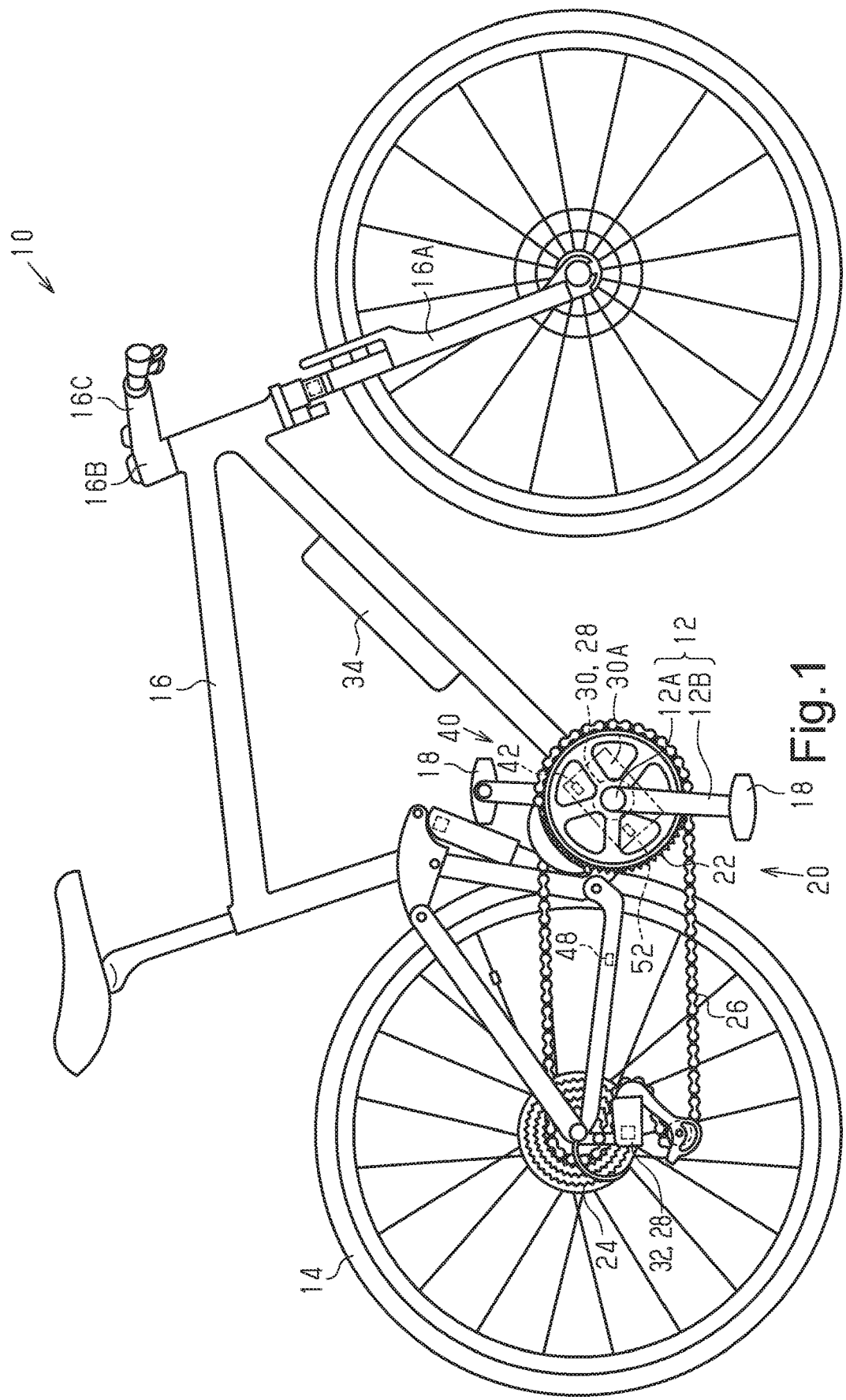
FIG. 1 is a side elevational view of a human-powered vehicle including a human-powered vehicle control device in accordance with a first embodiment.

As shown in FIG. 1, the human-powered vehicle 10 includes a crank 12 and a drive wheel 14. The human-powered vehicle 10 further includes a frame 16. Human drive force H is input to the crank 12. The crank 12 includes a crankshaft 12A rotatable relative to the frame 16 and a crank arm 12B provided on each of the opposite axial ends of the crankshaft 12A. A pedal 18 is coupled to each of the crank arms 12B. The drive wheel 14 is driven in accordance with rotation of the crank 12. The drive wheel 14 is supported by the frame 16. The crank 12 and the drive wheel 14 are coupled by a drive mechanism 20. The drive mechanism 20 includes a first rotary body 22 coupled to the crankshaft 12A. The crankshaft 12A and the first rotary body 22 can be coupled via a first one-way clutch. The first one-way clutch is configured to allow forward rotation of the first rotary body 22 in a case in which the crank 12 rotates forward and prohibit rearward rotation of the first rotary body 22 in a case in which the crank 12 rotates rearward. The first rotary body 22 includes a sprocket, a pulley, or a bevel gear. The drive mechanism 20 further includes a coupling member 26 and a second rotary body 24. The coupling member 26 transmits rotational force of the first rotary body 22 to the second rotary body 24. The coupling member 26 includes, for example, a chain, a belt, or a shaft.

The second rotary body 24 is coupled to the drive wheel 14. The second rotary body 24 includes a sprocket, a pulley, or a bevel gear. Preferably, a second one-way clutch is provided between the second rotary body 24 and the drive wheel 14. The second one-way clutch is configured to allow forward rotation of the drive wheel 14 in a case in which the second rotary body 24 rotates forward and prohibit rearward rotation of the drive wheel 14 in a case in which the second rotary body 24 rotates rearward.

The human-powered vehicle 10 includes a front wheel and a rear wheel. The front wheel is attached to the frame 16 via a front fork 16A. A handlebar 16C is coupled to the front fork 16A via a stem 16B. In the embodiments described below, the drive wheel 14 refers to the rear wheel. However, the front wheel can be the drive wheel 14.

Figure 2:
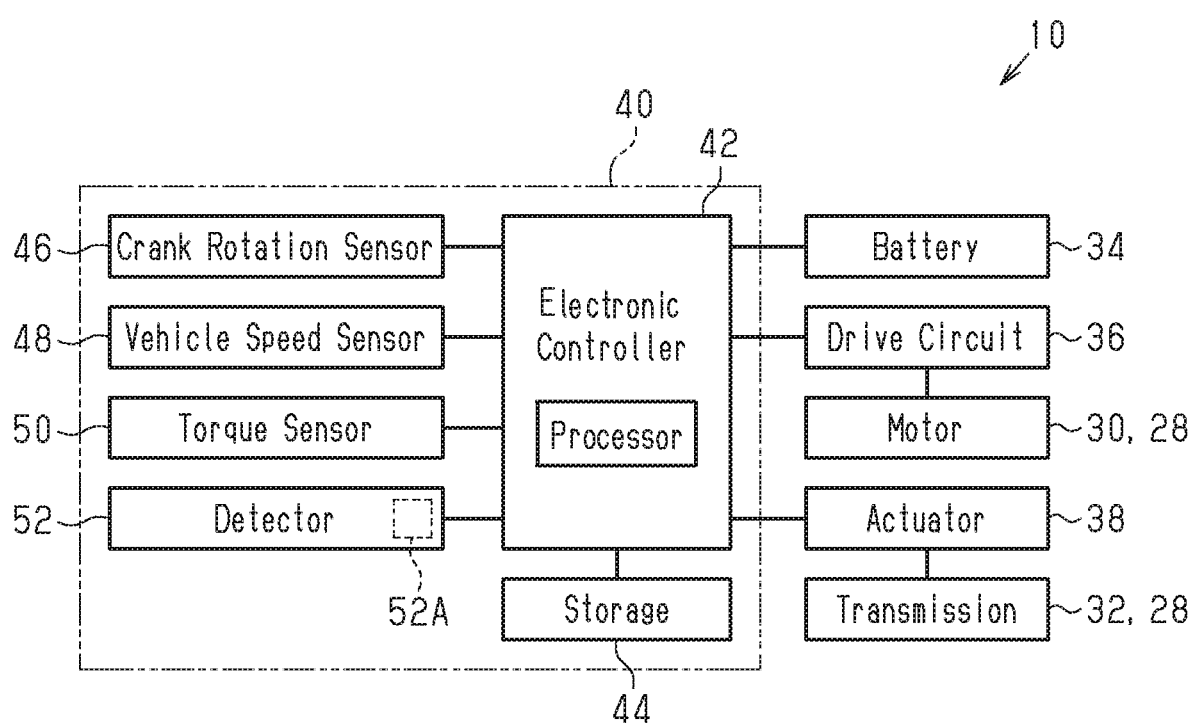
FIG. 2 is a block diagram showing an electrical configuration of the human-powered vehicle of the human-powered vehicle control device in accordance with the first embodiment.

As shown in FIGS. 1 and 2, the human-powered vehicle 10 further includes a human-powered vehicle component 28. The human-powered vehicle component 28 includes at least one of a motor 30 that assists in propulsion of the human-powered vehicle 10 and a transmission 32 that changes a first ratio R of a rotational speed of the drive wheel 14 to a rotational speed N of the crank 12 of the human-powered vehicle 10. In the present embodiment, the human-powered vehicle component 28 includes both the motor 30 and the transmission 32, and the human-powered vehicle component 28 includes the motor 30.

The human-powered vehicle 10 further includes a battery 34, a drive circuit 36 of the motor 30, and an actuator 38 of the transmission 32. The motor 30 configures a drive unit together with the drive circuit 36.

The battery 34 includes one or more battery cells. The battery cells include a rechargeable battery. The battery 34 supplies electric power to other electric components, such as the motor 30 and the control device 40, provided on the human-powered vehicle 10 and electrically connected to the battery 34 by wires. The battery 34 is connected to an electronic controller 42 of the control device 40 to perform wired or wireless communication with the controller 42. Hereinafter, the electronic controller 42 will simply be referred to as the controller 42. The battery 34 is configured to communicate with the controller 42, for example, through power line communication (PLC). The battery 34 can be attached to the exterior of the frame 16 or can be at least partially accommodated in the frame 16.

Preferably, the motor 30 and the drive circuit 36 are provided on the same housing 30A. The drive circuit 36 controls power supplied to the motor 30 from the battery 34. The drive circuit 36 is connected to the controller 42 to perform wired or wireless communication with the controller 42. The drive circuit 36 is configured to communicate with the controller 42, for example, through serial communication. The drive circuit 36 drives the motor 30 in accordance with a control signal from the controller 42. The drive circuit 36 includes an inverter circuit. The motor 30 assists in propulsion of the human-powered vehicle 10. The motor 30 includes an electric motor. The motor 30 is provided to transmit rotation to the front wheel or a power transmission path of the human drive force H extending from the pedals 18 to the rear wheel. The motor 30 is provided on the frame 16 of the human-powered vehicle 10, the rear wheel, or the front wheel. In the present embodiment, the motor 30 is coupled to the power transmission path between the crankshaft 12A and the first rotary body 22. A one-way clutch can be provided on the power transmission path between the motor 30 and the crankshaft 12A so that in a case in which the crankshaft 12A is rotated in a direction in which the human-powered vehicle 10 travels forward, the motor 30 will not be rotated by the rotational force of the crank 12. Configurations other than the motor 30 and the drive circuit 36 can be provided on the housing 30A on which the motor 30 and the drive circuit 36 are provided. For example, a speed reduction unit that reduces the speed of rotation of the motor 30 and outputs the rotation can be provided on the housing 30A.

The transmission 32 configures a transmission device together with the actuator 38. The transmission 32 changes the first ratio R of a rotational speed of the drive wheel 14 to the rotational speed N of the crank 12. The transmission 32 is configured to change the first ratio R in a stepped manner. The transmission 32 can be configured to change the first ratio R in a continuous manner. The actuator 38 performs a shifting operation on the transmission 32. The transmission 32 is controlled by the controller 42. The actuator 38 is connected to the controller 42 to perform wired or wireless communication with the controller 42. The actuator 38 is configured to communicate with the controller 42, for example, through power line communication (PLC). The actuator 38 performs a shifting operation on the transmission 32 in accordance with a control signal from the controller 42. The transmission 32 includes at least one of an internal shifting unit and a derailleur. The derailleur includes at least one of a front derailleur and a rear derailleur. In the present embodiment, the transmission 32 includes a rear derailleur. The actuator 38 can be included in the transmission 32.

The control device 40 includes the controller 42. The control device 40 further includes a storage (memory device) 44, a crank rotation sensor 46, a vehicle speed sensor 48, and a torque sensor 50.

The crank rotation sensor 46 is used to detect the rotational speed N of the crank 12. The crank rotation sensor 46 is provided on the frame 16 of the human-powered vehicle 10 or the housing 30A on which the motor 30 is provided. The crank rotation sensor 46 is configured to include a magnetic sensor that outputs a signal corresponding to the strength of a magnetic field. An annular magnet having a magnetic field, the strength of which changes in the circumferential direction, is provided on the crankshaft 12A or the power transmission path between the crankshaft 12A and the first rotary body 22. The crank rotation sensor 46 can be any sensor that can produce a signal that is indicative of the rotational speed N of the crank 12. The crank rotation sensor 46 is connected to the controller 42 to perform wired or wireless communication with the controller 42. The crank rotation sensor 46 transmits a signal corresponding to the rotational speed N of the crank 12 to the controller 42 of the control device 40.

The crank rotation sensor 46 can detect a magnet provided on a member that rotates integrally with the crankshaft 12A in the power transmission path of the human drive force H between the crankshaft 12A and the first rotary body 22. In a case in which no one-way clutch is provided between the crankshaft 12A and the first rotary body 22, the magnet detected by the crank rotation sensor 46 can be provided, for example, on the first rotary body 22.

The vehicle speed sensor 48 is used to detect a rotational speed of the wheel. The vehicle speed sensor 48 is electrically connected to the controller 42 through wired or wireless communication. The vehicle speed sensor 48 is connected to the controller 42 to perform wired or wireless communication with the controller 42. The vehicle speed sensor 48 can be any sensor that can produce a signal that is indicative of the rotational speed of the wheel. The vehicle speed sensor 48 transmits a signal corresponding to the rotational speed of the wheel to the controller 42. The controller 42 calculates a vehicle speed V of the human-powered vehicle 10 based on the rotational speed of the wheel. Preferably, the vehicle speed sensor 48 includes a magnetic reed that configures a reed switch or a Hall element. The vehicle speed sensor 48 can be attached to a chainstay of the frame 16 and configured to detect a magnet attached to the rear wheel or can be provided on the front fork 16A and configured to detect a magnet attached to the front wheel. Thus, in the case of a reed switch or a Hall element, the vehicle speed sensor 48 indirectly detects the rotational speed of the wheel by detecting a magnet attached to the wheel. Alternatively, the vehicle speed sensor 48 can directly detect the rotational speed of the wheel by using a speedometer gear assembly that is directly rotated by the wheel.

The torque sensor 50 is provided, for example, on the housing 30A on which the motor 30 is provided. The torque sensor 50 is used to detect a torque TH of the human drive force H input to the crank 12. The torque sensor 50 is provided, for example, on the power transmission path at the upstream side of the first one-way clutch. The torque sensor 50 includes, for example, a strain sensor or a magnetostriction sensor. The strain sensor includes a strain gauge. In a case in which the torque sensor 50 includes a strain sensor, the strain sensor is provided, for example, on the outer circumference of a rotary body included in the power transmission path. The torque sensor 50 can be any sensor that can produce a signal that is indicative of the human drive force H inputted to the crank 12. The torque sensor 50 is connected to the controller 42 through wired or wireless communication. The torque sensor 50 can include a wired or wireless communication unit. In this case, the communication unit of the torque sensor 50 is configured to communicate with the controller 42.

The terms "controller" and "electronic controller" as used herein refer to hardware that executes a software program and does not include a human. The controller 42 includes an arithmetic processing device that includes at least one processor that executes predetermined control programs. The arithmetic processing device includes, for example, a central processing unit (CPU) or a micro processing unit (MPU). The controller 42 can include one or more microcomputers with one or more processors. The controller 42 can include multiple arithmetic processing devices provided at separate locations. The storage 44 stores information used in various control programs and various control processes. The storage 44 includes any computer storage device or any non-transitory computer-readable medium with the sole exception of a transitory, propagating signal. For example, the storage 44 includes a non-volatile memory and a volatile memory. The controller 42 and the storage 44 are provided, for example, on the housing 30A on which the motor 30 is provided. The controller 42 can include the drive circuit 36.

The controller 42 is configured to control the motor 30 in accordance with the human drive force H input to the human-powered vehicle 10. The controller 42 is configured to control the motor 30 so that a second ratio X of an assist force M generated by the motor 30 to the human drive force H input to the crank 12 is set to a predetermined ratio. The predetermined ratio can be a fixed value, a value that varies in accordance with the human drive force H, a value that varies in accordance with the vehicle speed V, or a value that varies in accordance with the rotational speed N of the crank 12. The human drive force H includes the torque TH of the human drive force H or power (watt) of the human drive force H. In the description, the second ratio X can refer to a second ratio XT of a torque TM of the assist force M generated by the motor 30 to the torque TH of the human drive force H input to the human-powered vehicle 10. In the description, the second ratio X can refer to a second ratio XW of power (watt) of the assist force M generated by the motor 30 to power (watt) of the human drive force H input to the human-powered vehicle 10. Power of the human drive force H is calculated by multiplying the torque TH of the human drive force H input to the crank 12 and the rotational speed N of the crank 12. In a case in which output of the motor 30 is input to the power transmission path of the human drive force H via a speed reduction unit, output of the speed reduction unit is the assist force M of the motor 30. In a case in which the speed of the human-powered vehicle 10 is higher than or equal to a predetermined speed, the controller 42 stops the assist of the motor 30. The predetermined speed is, for example, 25 km/h or 45 km/h.

The control device 40 further includes a detector 52 that detects an inclination angle D. The term "detector" as used herein refers to a hardware device or instrument designed to detect the presence of a particular object or substance and to emit a signal in response. The term "detector" as used herein do not include a human. The detector 52 includes a gyroscope 52A. In the present embodiment, the detector 52 is provided on the housing 30A on which the motor 30 is provided. Preferably, the detector 52 is accommodated in the housing 30A on which the motor 30 is provided. The detector 52 is attached to the frame 16 of the human-powered vehicle 10 via the housing 30A. The gyroscope 52A corresponds to a mount that is mountable on the frame 16 of the human-powered vehicle 10. Preferably, the gyroscope 52A includes a three-axis gyroscope 52A. Preferably, the gyroscope 52A is configured to detect a yaw angle DY of the human-powered vehicle 10, a roll angle DR of the human-powered vehicle 10, and a pitch angle DP of the human-powered vehicle 10. Preferably, the gyroscope 52A is provided on the human-powered vehicle 10 so that the three axes extend in the front-rear direction, the sideward direction, and the vertical direction of the human-powered vehicle 10. The gyroscope 52A can include a one-axis gyroscope or a two-axis gyroscope. The detector 52 can include an acceleration sensor. The detector 52 can be configured to correct the inclination angle D in accordance with a detection result of the acceleration sensor.

The controller 42 controls the human-powered vehicle component 28. The controller 42 is configured to control the human-powered vehicle component 28 in a first control state and a second control state that differs from the first control state. In a case in which a value E related to a first change rate EX of the inclination angle D of the human-powered vehicle 10 is greater than or equal to a first predetermined value EA in the first control state, the controller 42 changes the first control state to the second control state. The inclination angle D of the human-powered vehicle 10 includes at least one of the yaw angle DY of the human-powered vehicle 10 and the roll angle DR of the human-powered vehicle 10. The inclination angle D can further include the pitch angle DP of the human-powered vehicle 10. Preferably, the first predetermined value EA is greater than zero. In the present embodiment, the controller 42 controls the motor 30. In the first control state, the controller 42 controls the motor 30 in accordance with the human drive force H. The controller 42 can be activated in the first control state by the supply of power or can become the first control state by selecting the assist mode with an operating portion.

The value E related to the first change rate EX of the inclination angle D can be the first change rate EX or can be a change rate of the first change rate EX. The first change rate EX is obtained from an amount of the inclination angle D that is changed in a predetermined amount of time. The change rate of the first change rate EX is obtained by performing a time derivative on the first change rate EX. The value E related to the first change rate EX can be a value obtained by performing derivatives on the first change rate EX multiple times. The value E related to the first change rate EX can include a value EY related to a first change rate EXY of the yaw angle DY or can include a value ER related to a first change rate EXR of the roll angle DR. In a case in which the value E related to the first change rate EX includes the value EY related to the first change rate EXY of the yaw angle DY, the first change rate EX can be the first change rate EXY or can be a change rate of the first change rate EXY. In a case in which the value E related to the first change rate EX includes the value ER related to the first change rate EXR of the roll angle DR, the first change rate EX can be the first change rate EXR or can be a change rate of the first change rate EXR.

In a first example, the controller 42 controls the motor 30 so that the second ratio X of the assist force M produced by the motor 30 to human drive force in the second control state is smaller than the second ratio X in the first control state. Preferably, the controller 42 controls the motor 30 so as not to assist in propulsion of the human-powered vehicle 10 in the second control state. In a second example, the controller 42 controls the motor 30 so that an upper limit value MX of an output of the motor 30 in the second control state is smaller than the upper limit value MX of an output of the motor 30 in the first control state. The upper limit value MX of the output of the motor 30 can be an upper limit value of the torque TM of the assist force M generated by the motor 30 or can be an upper limit value of power of the assist force M generated by the motor 30. The controller 42 can execute only one of the first example and the second example or can execute both the first example and the second example.

In a case in which the value E related to the first change rate EX is less than a second predetermined value EB in the second control state, the controller 42 changes the second control state to the first control state. Preferably, the second predetermined value EB is greater than zero. The second predetermined value EB can be equal to the first predetermined value EA.

The process for switching between the first control state and the second control state will now be described with reference to FIG. 3. In a case in which the controller 42 is supplied with power from the battery 34, the controller 42 starts the process and proceeds to step S11 in the flowchart shown in FIG. 3. As long as the power is supplied, the controller 42 executes the process from step S11 in predetermined cycles.

In step S11, the controller 42 determines whether the control state is the first control state. In a case in which the control state is not the first control state, the controller 42 ends the process. In a case in which the control state is the first control state, the controller 42 proceeds to step S12.

In step S12, the controller 42 determines whether the value E related to the first change rate EX of the inclination angle D is greater than or equal to the first predetermined value EA. For example, in a case in which the first change rate EXY of the yaw angle DY is greater than or equal to a first predetermined value EXY1 or the first change rate EXR of the roll angle DR is greater than or equal to a first predetermined value EXR1, the controller 42 determines that the value E related to the first change rate EX of the inclination angle D is greater than or equal to the first predetermined value EA. In a case in which the value E related to the first change rate EX of the inclination angle D is not greater than or equal to the first predetermined value EA, the controller 42 ends the process. In a case in which the value E related to the first change rate EX of the inclination angle D is greater than or equal to the first predetermined value EA, the controller 42 proceeds to step S13.

In step S13, the controller 42 changes the first control state to the second control state and proceeds to step S14. The controller 42, for example, controls the motor 30 so as not to assist in propulsion of the human-powered vehicle 10 by changing the first control state to the second control state.

In step S14, the controller 42 determines whether the value E related to the first change rate EX of the inclination angle D is less than the second predetermined value EB. For example, in a case in which the first change rate EXY of the yaw angle DY is greater than or equal to a second predetermined value EXY2 or the first change rate EXR of the roll angle DR is greater than or equal to a second predetermined value EXR2, the controller 42 determines that the value E related to the first change rate EX of the inclination angle D is greater than or equal to the second predetermined value EB. Alternatively, for example, in a case in which the first change rate EXY of the yaw angle DY is greater than or equal to the second predetermined value EXY2 and the first change rate EXR of the roll angle DR is greater than or equal to the second predetermined value EXR2, the controller 42 can determine that the value E related to the first change rate EX of the inclination angle D is greater than or equal to the second predetermined value EB. The controller 42 repeats step S14 until the value E related to the first change rate EX of the inclination angle D becomes less than the second predetermined value EB. In a case in which the value E related to the first change rate EX of the inclination angle D is less than the second predetermined value EB, the controller 42 proceeds to step S15.

In step S15, the controller 42 changes the second control state to the first control state and ends the process. By changing the second control state to the first control state, the controller 42 controls the motor 30 to assist in propulsion of the human-powered vehicle 10 in accordance with the human drive force H in the same manner as before the switching to the second control state in step S13.

In a case in which the value E related to the first change rate EX of the inclination angle D is greater than or equal to the first predetermined value EA, the posture of the human-powered vehicle 10 is changing to incline from the road surface, the horizontal plane, or the travel direction immediately before the change. In this case, the controller 42 changes the first control state to the second control state. This reduces the output of the motor 30 and allows the rider to readily stabilize the behavior of the human-powered vehicle 10.

In the present embodiment, the first control state includes a third control state. Preferably, the controller 42 is configured to control the motor 30 in the third control state and a fourth control state that differs from the third control state.

In the third control state, the controller 42 controls the motor 30 in accordance with the human drive force H. In a case in which the pitch angle DP of the human-powered vehicle 10 or a value F related to a second change rate FX of the pitch angle DP of the human-powered vehicle 10 is greater than or equal to a third predetermined value and the pitch angle DP of the human-powered vehicle 10 increases in the third control state, the controller 42 changes the third control state to the fourth control state. In the present embodiment, in a case in which the pitch angle DP of the human-powered vehicle 10 is greater than or equal to a third predetermined value DPB and the pitch angle DP of the human-powered vehicle 10 increases in the third control state, the controller 42 changes the third control state to the fourth control state. Preferably, the third predetermined value DPB related to the pitch angle DP is greater than zero. The value F related to the second change rate FX of the pitch angle DP can be the second change rate FX or can be a change rate of the second change rate FX. The second change rate FX is obtained by an amount of the pitch angle DP that is changed in in a predetermined amount of time. The change rate of the second change rate FX is obtained by performing a time derivative on the second change rate FX. The value F related to the second change rate FX can be a value obtained by performing derivatives on the second change rate FX multiple times. Preferably, the controller 42 controls the motor 30 so that the second ratio X of the assist force M generated by the motor 30 to the human drive force H in the fourth control state is greater than or equal to the second ratio X in the third control state.

The process for switching between the third control state and the fourth control state will now be described with reference to FIG. 4. In a case in which the controller 42 is supplied with power from the battery 34, the controller 42 starts the process and proceeds to step S21 in the flowchart shown in FIG. 4. As long as the power is supplied, the controller 42 executes the process from step S21 in predetermined cycles.

In step S21, the controller 42 determines whether the control state is the third control state. In a case in which the motor 30 is controlled in accordance with the human drive force H, the controller 42 determines that the control state is the third control state. In a case in which the control state is not the third control state, the controller 42 ends the process. In a case in which the control state is the third control state, the controller 42 proceeds to step S22.

In step S22, the controller 42 determines whether the pitch angle DP is greater than or equal to the third predetermined value DPB. In a case in which the pitch angle DP is not greater than or equal to the third predetermined value DPB, the controller 42 ends the process. In a case in which the pitch angle DP is greater than or equal to the third predetermined value DPB, the controller 42 proceeds to step S23.

In step S23, the controller 42 determines whether the pitch angle DP is increasing. In a case which the pitch angle DP is not increasing, the controller 42 ends the process. In a case in which the pitch angle DP is increasing, the controller 42 proceeds to step S24.

In step S24, the controller 42 changes the third control state to the fourth control state and proceeds to step S25. In step S25, the controller 42 determines whether the pitch angle DP is less than the third predetermined value DPB. The controller 42 repeats step S25 until the pitch angle DP becomes less than the third predetermined value DPB. In a case in which the pitch angle DP is less than the third predetermined value DPB, the controller 42 proceeds to step S26. In step S26, the controller 42 changes the fourth control state to the third control state and ends the process.

In the present embodiment, the first control state includes a fifth control state. Preferably, the controller 42 is configured to control the motor 30 in the fifth control state and a sixth control state that differs from the fifth control state. In the fifth control state, the controller 42 controls the motor 30 in accordance with the human drive force H. In a case in which the absolute value of the value F related to the second change rate FX of the pitch angle DP of the human-powered vehicle 10 is greater than or equal to a fourth predetermined value FB and the pitch angle DP of the human-powered vehicle 10 decreases in the fifth control state, the controller 42 changes the fifth control state to the sixth control state. Preferably, the controller 42 controls the motor 30 so that the second ratio X of the assist force M generated by the motor 30 to the human drive force H in the sixth control state is smaller than the second ratio X in the fifth control state. Preferably, in the sixth control state, the controller 42 controls the motor 30 so as not to assist in propulsion of the human-powered vehicle 10.

The process for switching between the fifth control state and the sixth control state will now be described with reference to FIG. 5. In a case in which the controller 42 is supplied with power from the battery 34, the controller 42 starts the process and proceeds to step S31 in the flowchart shown in FIG. 5. As long as the power is supplied, the controller 42 executes the process from step S31 in predetermined cycles.

In step S31, the controller 42 determines whether the control state is the fifth control state. In a case in which the motor 30 is controlled in accordance with the human drive force H, the controller 42 determines that the control state is the fifth control state. In a case in which the control state is not the fifth control state, the controller 42 ends the process. In a case in which the control state is the fifth control state, the controller 42 proceeds to step S32.

In step S32, the controller 42 determines the absolute value of the value F related to the second change rate FX of the pitch angle DP is greater than or equal to the fourth predetermined value FB. For example, in a case in which the absolute value of the second change rate FX of the pitch angle DP is greater than or equal to a fourth predetermined value FXA, the controller 42 determines that the absolute value of the value F related to the second change rate FX of the pitch angle DP is greater than or equal to the fourth predetermined value FB. In a case in which the absolute value of the value F related to the second change rate FX of the pitch angle DP is not greater than or equal to the fourth predetermined value FB, the controller 42 ends the process. In a case in which the absolute value of the value F related to the second change rate FX of the pitch angle DP is greater than or equal to the fourth predetermined value FB, the controller 42 proceeds to step S33.

In step S33, the controller 42 determines whether the pitch angle DP is decreasing. In a case in which the pitch angle DP is not decreasing, the controller 42 ends the process. In a case in which the pitch angle DP is decreasing, the controller 42 proceeds to step S34. In step S34, the controller 42 changes the fifth control state to the sixth control state and proceeds to step S35.

In step S35, the controller 42 determines whether the absolute value of the value F related to the second change rate FX of the pitch angle DP is less than the fourth predetermined value FB. For example, in a case in which the absolute value of the second change rate FX of the pitch angle DP is less than the fourth predetermined value FXA, the controller 42 determines that the absolute value of the value F related to the second change rate FX of the pitch angle DP is less than the fourth predetermined value FB. The controller 42 repeats step S35 until the absolute value of the second change rate FX of the pitch angle DP becomes less than the fourth predetermined value FXA. In step S36, the controller 42 changes the sixth control state to the fifth control state and ends the process.

Figure 3:
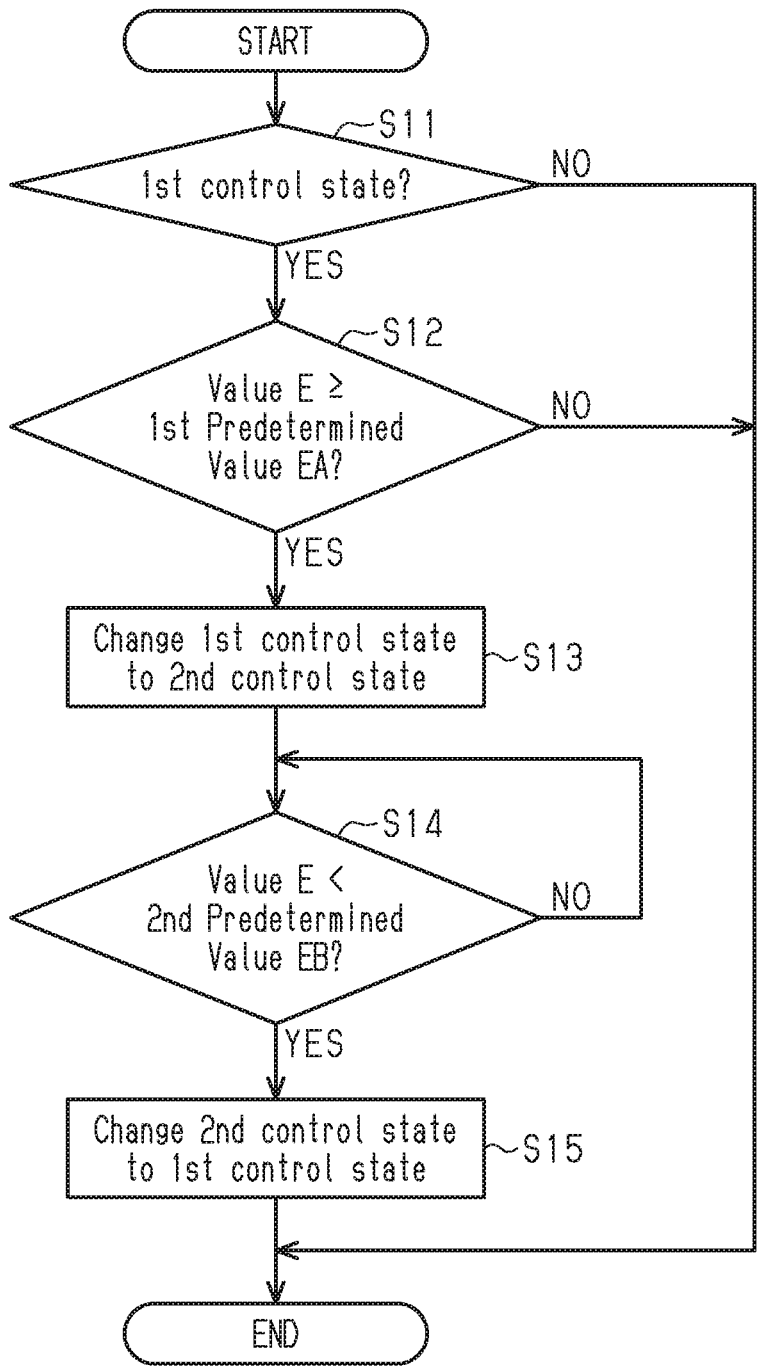
FIG. 3 is a flowchart of a control process for switching between a first control state and a second control state executed by the electronic controller shown in FIG. 2.
Figure 4:
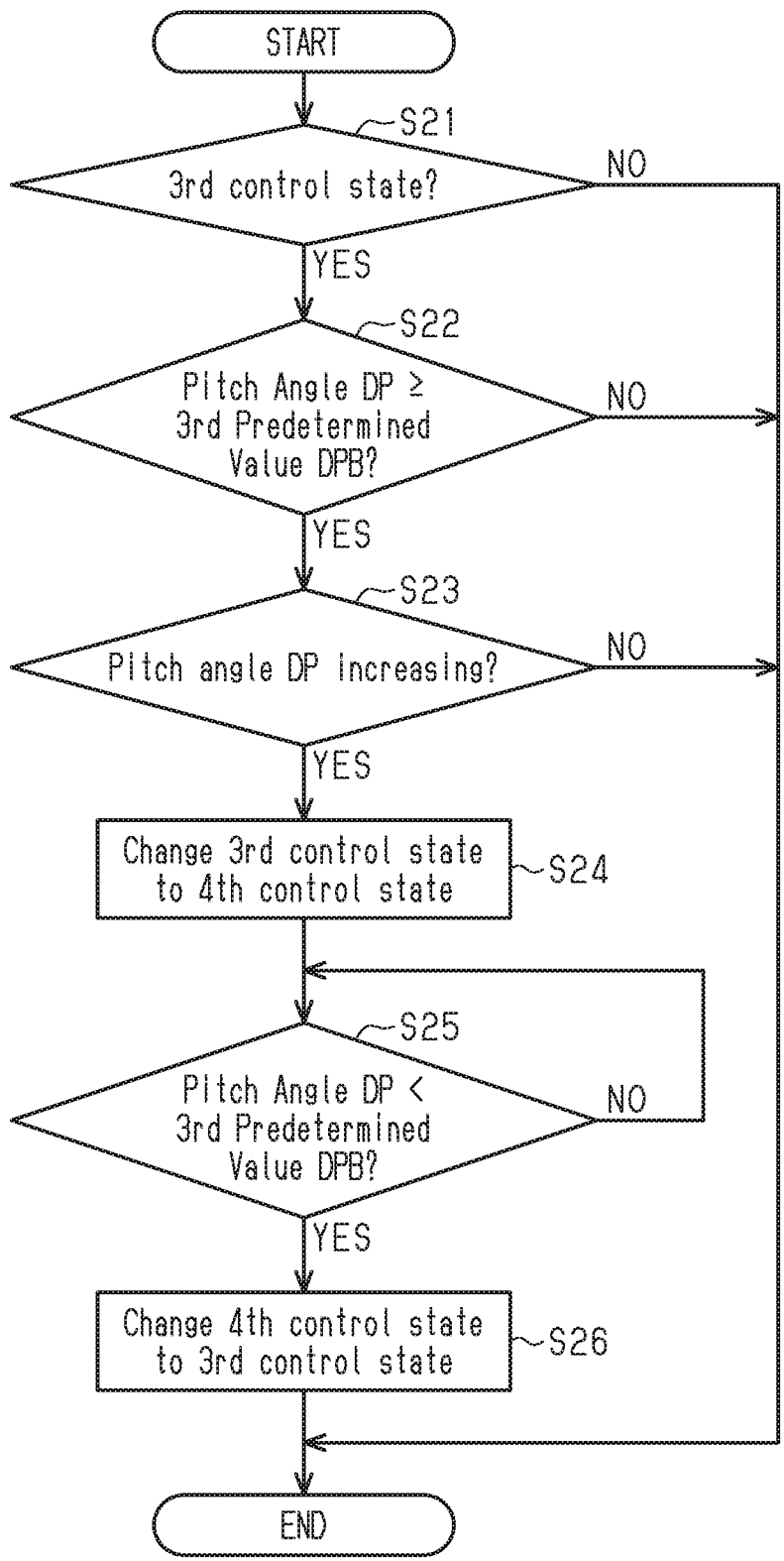
FIG. 4 is a flowchart of a control process for switching between a third control state and a fourth control state executed by the electronic controller shown in FIG. 2.
Figure 5:
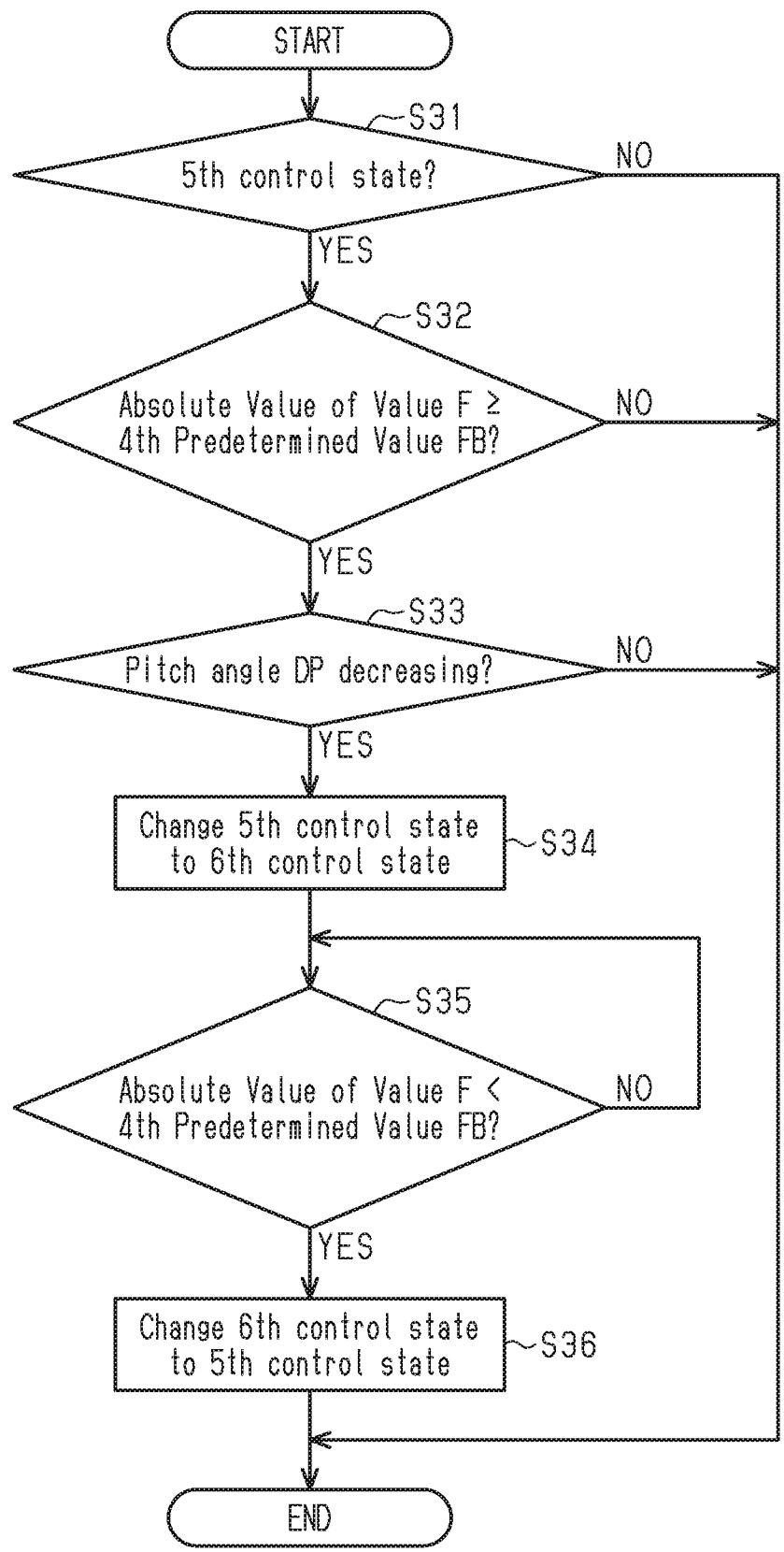
FIG. 5 is a flowchart of a control process for switching between a fifth control state and a sixth control state executed by the electronic controller shown in FIG. 2.

The controller 42 can execute the processes shown in FIGS. 3, 4, and 5 in parallel. In this case, the controller 42 can control the motor 30 in a control state that combines one of the first control state and the second control state, one of the third control state and the fourth control state, and one of the fifth control state and the sixth control state. For example, the process shown in FIG. 4 can be executed using the second control state or the sixth control state as the third control state. The process shown in FIG. 5 can be executed using the second control state or the third control state as the fifth control state. The process shown in FIG. 3 can be executed using the third control state or the sixth control state as the first control state. The storage unit 44 can store programs corresponding to each combination of the control state. In this case, the controller 42 can select a single control state from the combinations and control the motor 30 in the selected control state. In a case in which the control state is one of the second control state, the fourth control state, and the sixth control state, the controller 42 can be configured not to be changed to the others of the second control state, the fourth control state, and the sixth control state until the one of the second control state, the fourth control state, and the sixth control state changes to the preceding control state.

Figure 6:
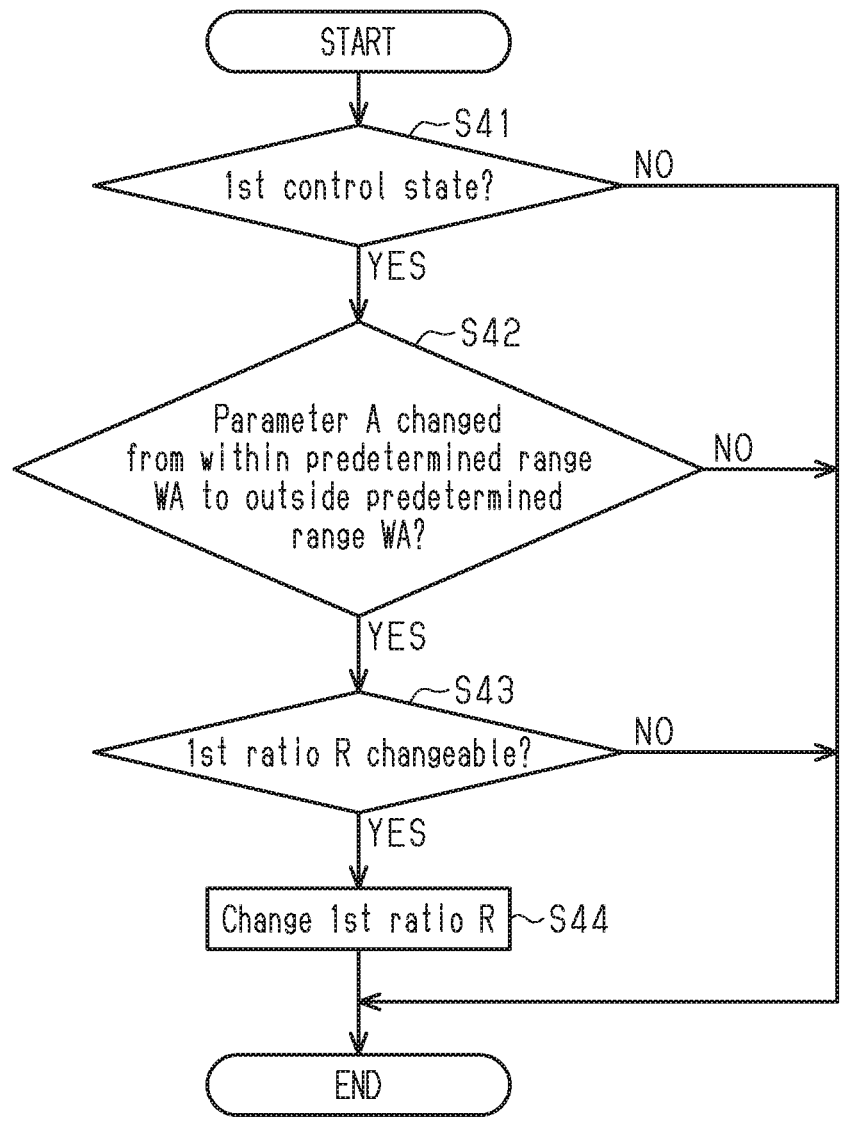
FIG. 6 is a flowchart of a control process for changing a first ratio executed by a second embodiment of the electronic controller shown in FIG. 2 in accordance with a modification.

A control process executed by the controller 42 of the control device 40 will now be described with reference to FIGS. 2 and 6. The control process of FIG. 6 is the same as the control process of the first embodiment except that the controller 42 controls the transmission 32, instead of the motor 30, in accordance with the inclination angle D. Thus, the same reference characters are given to those elements that are the same as the corresponding elements of the first embodiment. Such elements will not be described in detail.

The human-powered vehicle component 28 includes the transmission 32.

In a first example, the controller 42 controls the transmission 32 so that the first ratio R in the second control state is smaller than the first ratio R in the first control state.

In a second example, the controller 42 controls the transmission 32 so as to change the first ratio R in accordance with a travel state of the human-powered vehicle 10 in the first control state and does not control the transmission 32 in accordance with the travel state of the human-powered vehicle 10 in the second control state. The controller 42 can perform only one of the first example and the second example or both.

In the second example, in a case where a parameter A related to the travel state of the human-powered vehicle 10 shifts from within a predetermined range WA to outside the predetermined range WA in the first control state, the controller 42 controls the transmission 32 so as to change the first ratio R. The parameter A includes at least one of the rotational speed N of the crank 12 of the human-powered vehicle 10 and the human drive force H input to the human-powered vehicle 10. For example, the controller 42 increases the first ratio R in a case in which the rotational speed N of the crank 12 is greater than an upper limit value of the predetermined range WA, and decreases the first ratio R in a case in which the rotational speed N of the crank 12 is less than a lower limit value of the predetermined range WA. For example, the controller 42 decreases the first ratio R in a case in which the human drive force H is greater than the upper limit value of the predetermined range WA, and increases the first ratio R in a case in which the human drive force H is less than the lower limit value of the predetermined range WA.

The process for changing the first ratio R in accordance with the parameter A will now be described with reference to FIG. 6. In a case in which the controller 42 is supplied with power from the battery 34, the controller 42 starts the process and proceeds to step S41 in the flowchart shown in FIG. 6. As long as the power is supplied, the controller 42 executes the process from step S41 in predetermined cycles.

In step S41, the controller 42 determines whether the control state is the first control state. In a case in which the control state is not the first control state, the controller 42 ends the process. In a case in which the control state is the first control state, the controller 42 proceeds to step S42.

In step S42, the controller 42 determines whether the parameter A is shifted from within the predetermined range WA to outside the predetermined range WA. In a case in which the parameter A is not shifted from within the predetermined range WA to outside the predetermined range WA, the controller 42 ends the process. In a case in which the parameter A is shifted from within the predetermined range WA to outside the predetermined range WA, the controller 42 proceeds to step S43.

In step S43, the controller 42 determines whether the first ratio R is changeable. For example, in a case in which the first ratio R decreases due to the rotational speed N of the crank 12 being less than the lower limit value of the predetermined range WA or the human drive force H being greater than the upper limit value of the predetermined range WA, the controller 42 determines that the first ratio R is changeable if the first ratio R is greater than the minimum first ratio R of the transmission 32. For example, in a case in which the first ratio R increases due to the rotational speed N of the crank 12 being greater than the upper limit value of the predetermined range WA or the human drive force H being less than the lower limit value of the predetermined range WA, the controller 42 determines that the first ratio R is changeable if the first ratio R is less than the maximum first ratio R of the transmission 32. In a case in which the first ratio R is not changeable, the controller 42 ends the process. In a case in which the first ratio R is changeable, the controller 42 proceeds to step S44.

In step S44, the controller 42 changes the first ratio R and ends the process. For example, in a case in which the rotational speed N of the crank 12 is less than the lower limit value of the predetermined range WA or the human drive force H is greater than the upper limit value of the predetermined range WA, the controller 42 controls the transmission 32 so that the first ratio R decreases. For example, in a case in which the rotational speed N of the crank 12 is greater than the upper limit value of the predetermined range WA or the human drive force H is less than the lower limit value of the predetermined range WA, the controller 42 controls the transmission 32 so that the first ratio R increases.

Modification

The description related to the embodiments exemplifies, without any intention to limit, applicable forms of human-powered vehicle control devices according to the present disclosure. The human-powered vehicle control devices of the present disclosure can include, for example, modifications of the embodiments that are described below and combinations of at least two of the modifications that do not contradict each other. In the following modifications, the same reference characters are given to those elements that are the same as the corresponding elements of the embodiments. Such elements will not be described in detail.

Figure 7:
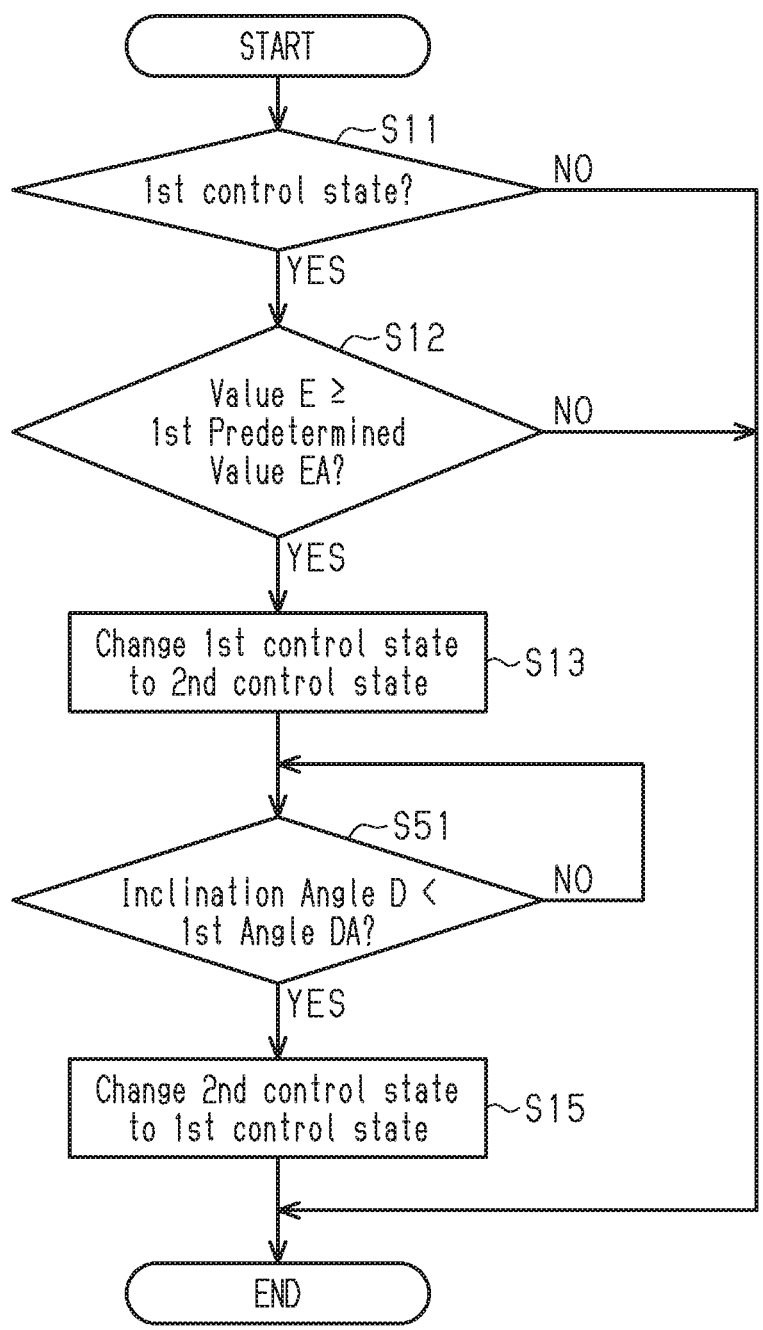
FIG. 7 is a flowchart of a control process for switching between the first control state and the second control state executed by the electronic controller shown in FIG. 2 in accordance with another modification.

In a case in which the inclination angle D of the human-powered vehicle 10 is less than a first angle DA in the second control state, the controller 42 can change the second control state to the first control state. For example, the controller 42 performs step S51 of FIG. 7 instead of step S14 of FIG. 3. In FIG. 7, the controller 42 proceeds to step S51 after step S13. In step S51, the controller 42 determines whether the inclination angle D is less than the first angle DA. For example, in a case in which the yaw angle DY is less than a first angle DYA or the roll angle DR is less than a first angle DRA, the controller 42 determines that the inclination angle D is less than the first angle DA. The controller 42 repeats step S51 until the inclination angle D becomes less than the first angle DA. In a case in which the inclination angle D is less than the first angle DA, the controller 42 proceeds to step S15. In step S51, in a case in which the yaw angle DY is less than the first angle DYA and the roll angle DR is less than the first angle DRA, the controller 42 can determine that the inclination angle D is less than the first angle DA.

Figure 8:
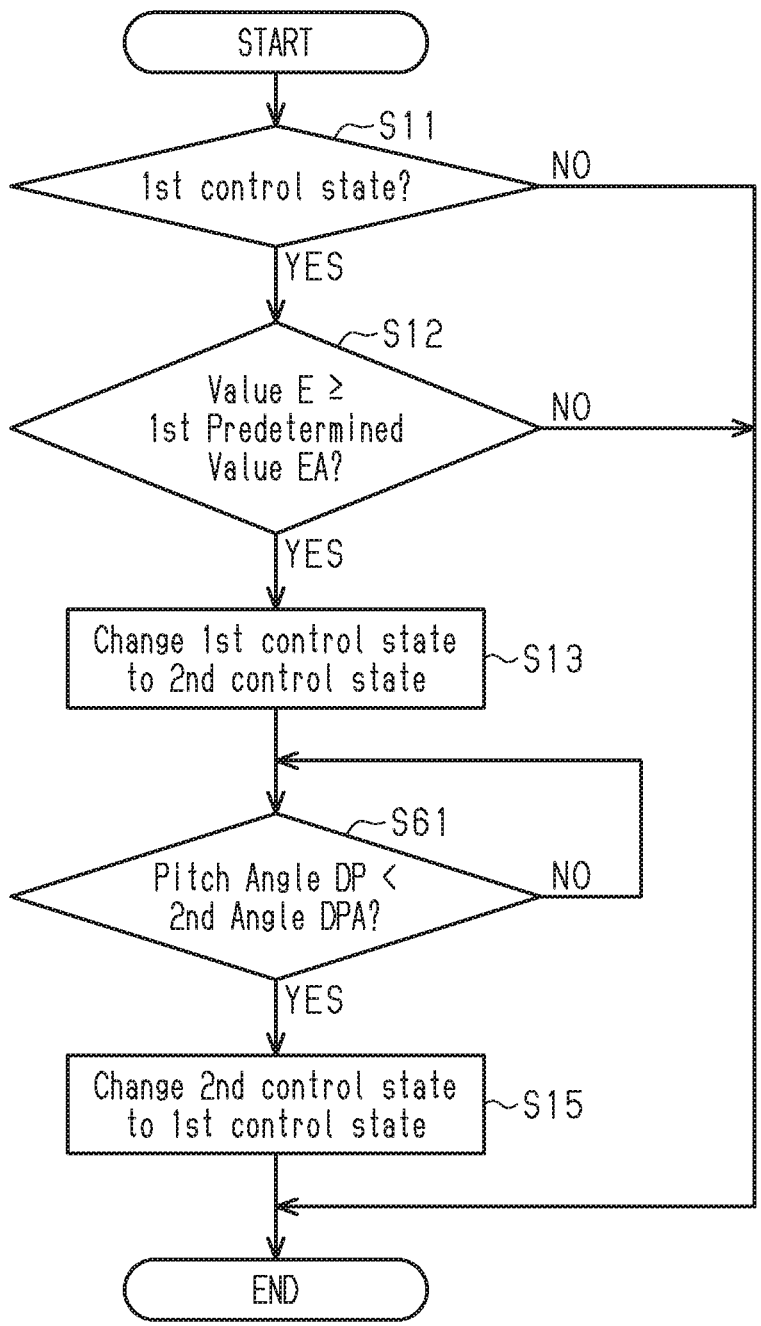
FIG. 8 is a flowchart of a process for switching between the first control state and the second control state executed by the electronic controller shown in FIG. 2 in accordance with another modification.

In a case in which the pitch angle DP of the human-powered vehicle 10 is less than a second angle DPA in the second control state, the controller 42 can change the second control state to the first control state. For example, the controller 42 performs step S61 of FIG. 8 instead of step S14 of FIG. 3. In FIG. 8, the controller 42 proceeds to step S61 after step S13. In step S61, the controller 42 determines whether the pitch angle DP is less than the second angle DPA. The controller 42 repeats step S61 until the pitch angle DP becomes less than the second angle DPA. In a case in which the pitch angle DP is less than the second angle DPA, the controller 42 proceeds to step S15.

In step S14 of FIG. 3, the controller 42 can proceed to step S15 in a case in which one or two of the following cases occur. The cases are the value E related to the first change rate EX of the inclination angle D being greater than or equal to the second predetermined value EB, the inclination angle D of the human-powered vehicle 10 being less than the first angle DA, and the pitch angle of the human-powered vehicle 10 being less than the second angle. Additionally, in step S14 of FIG. 3, the controller 42 can proceed to step S15 in a case in which all of the cases, that is, the value E related to the first change rate EX of the inclination angle D being greater than or equal to the second predetermined value EB, the inclination angle D of the human-powered vehicle 10 being less than the first angle DA, and the pitch angle of the human-powered vehicle 10 being less than the second angle, occur.

Figure 9:
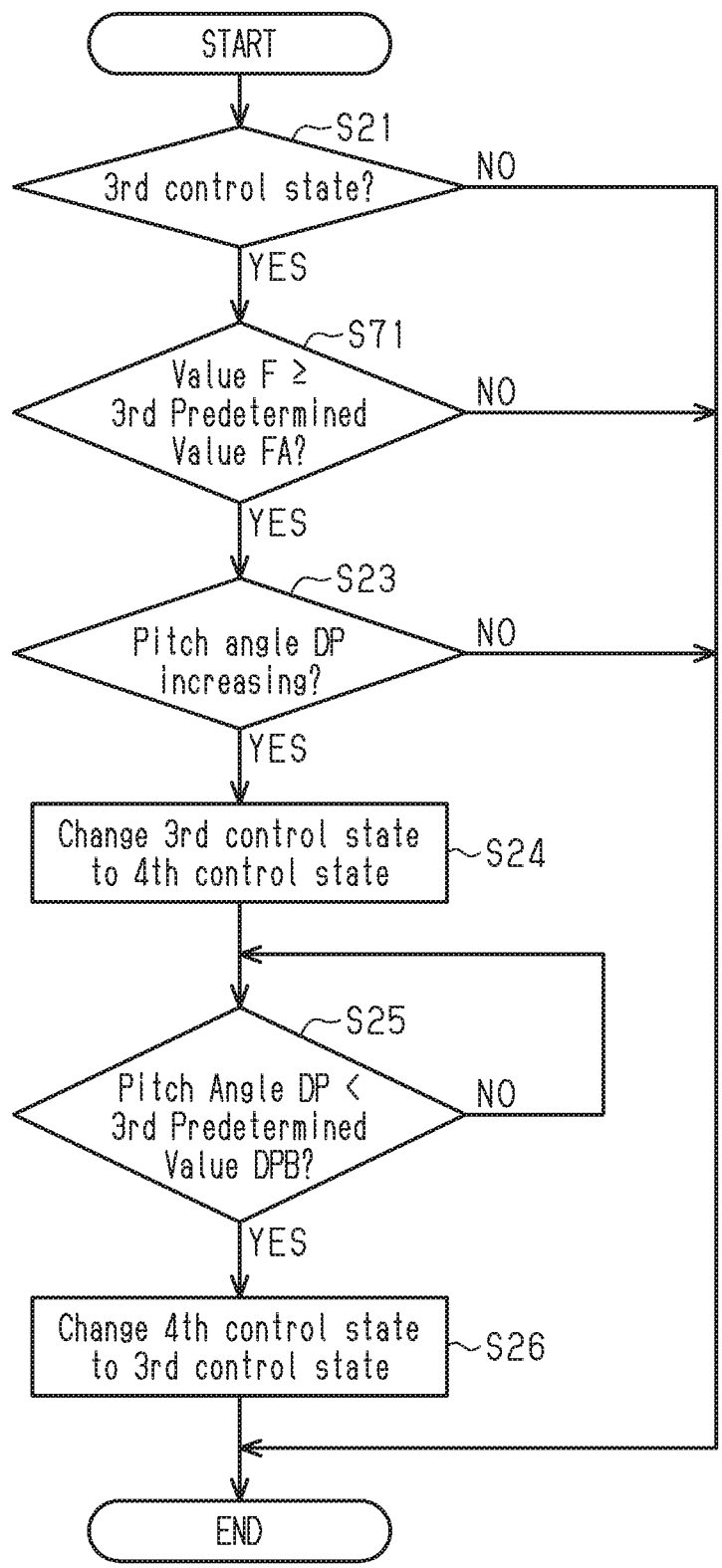
FIG. 9 is a flowchart of a process for switching between the third control state and the fourth control state executed by the electronic controller shown in FIG. 2 in accordance with another modification.

In the process shown in FIG. 4, in a case in which the value F related to the second change rate FX of the pitch angle DP of the human-powered vehicle 10 is greater than or equal to a third predetermined value FA and the pitch angle DP of the human-powered vehicle 10 increases in the third control state, the controller 42 can change the third control state to the fourth control state. Preferably, the third predetermined value FA is greater than zero. For example, step S22 of FIG. 4 can be changed to step S71 of FIG. 9. In FIG. 9, in a case in which the affirmative determination is made in step S21, the controller 42 proceeds to step S71. In step S71, the controller 42 determines whether the value F related to the second change rate FX of the pitch angle DP is greater than or equal to the third predetermined value FA. In a case in which the value F related to the second change rate FX of the pitch angle DP is not greater than or equal to the third predetermined value FA, the controller 42 ends the process. In a case in which the value F related to the second change rate FX of the pitch angle DP is greater than or equal to the third predetermined value FA, the controller 42 proceeds to step S23.

In the fourth control state, the condition for changing the fourth control state to the third control state can be changed. For example, in step S25 of FIGS. 4 and 9, the controller 42 can repeat step S25 until the pitch angle DP becomes less than a fifth predetermined value that differs from the third predetermined value DPB, and proceed to step S26 in a case in which the pitch angle DP is less than the fifth predetermined value.

In the sixth control state, the condition for changing the sixth control state to the fifth control state can be changed. For example, in step S35 of FIG. 5, the controller 42 can repeat step S25 until the absolute value of the value F related to the second change rate FX of the pitch angle DP becomes less than a sixth predetermined value that differs from the fourth predetermined value FB, and proceed to step S36 in a case in which the absolute value is less than the sixth predetermined value.

In the first embodiment, the controller 42 can execute the process of shown in FIG. 6.

In the first embodiment and its modifications, the controller 42 can be configured not to execute one of the processes shown in FIGS. 4 and 5.

The detector 52 can include an image sensor instead of or in addition to the gyroscope 52A. The image sensor detects an image of the surroundings of the human-powered vehicle 10. The image of the surroundings of the human-powered vehicle 10 includes, for example, an image of a road surface. The controller 42, for example, obtains the roll angle DR of the human-powered vehicle 10 by calculating the inclination angle of the road surface.

Figure 10:
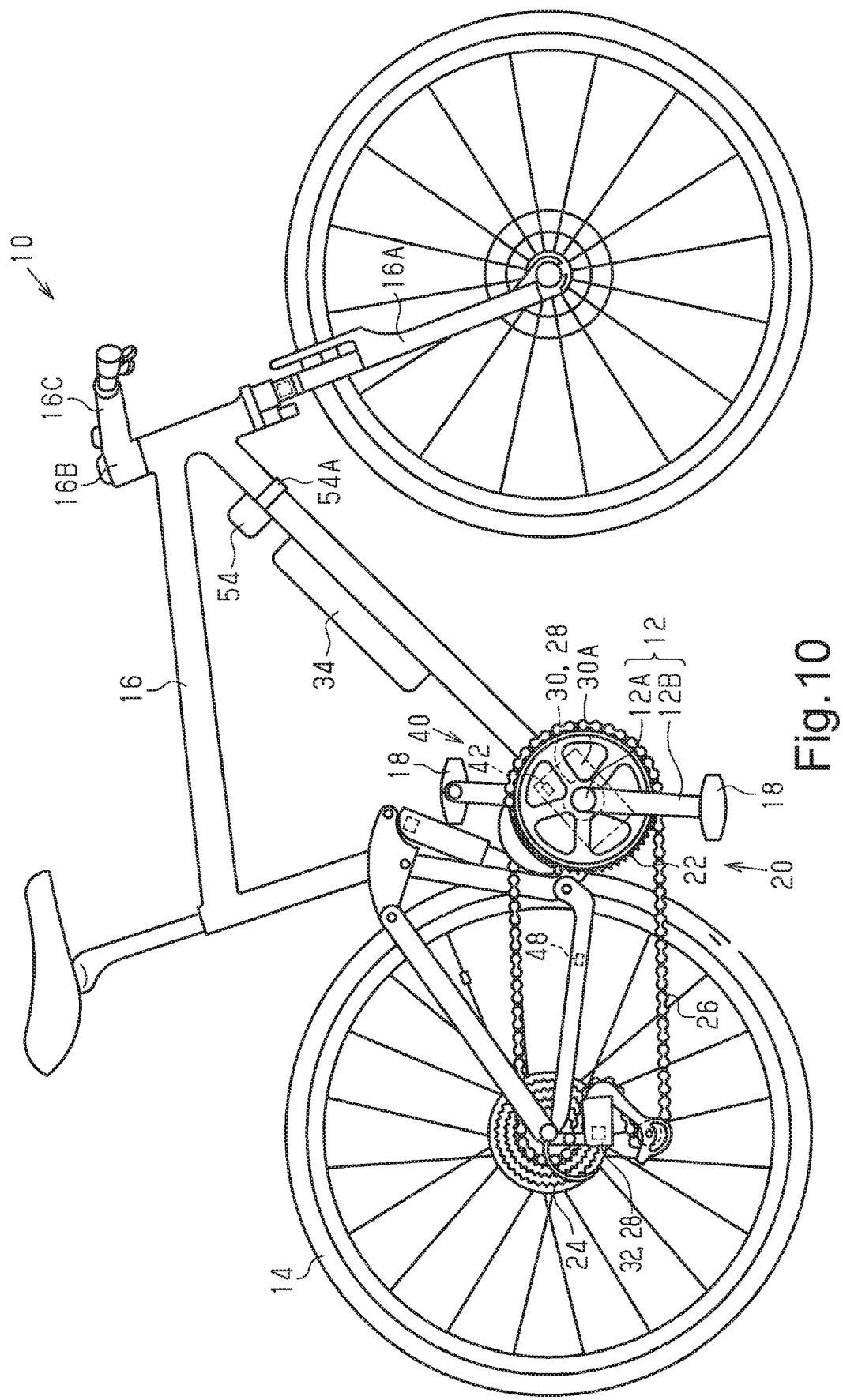
FIG. 10 is a side elevational view of a human-powered vehicle including a human-powered vehicle control device in accordance with another modification.

The detector 52 can be changed to a detector 54 shown in FIG. 10 including a mount 54A that is mountable on the frame 16 of the human-powered vehicle 10. In the example shown in FIG. 10, the mount 54A is mounted on a down tube of the frame 16.

The controller 42 can control the motor so that the second ratio X of the assist force M generated by the motor 30 to the human drive force H in the second control state is greater than the second ratio X in the first control state. This obtains, for example, advantages (1) and (2) described below. (1) In a case of performing slalom, the assist force is increased. This facilitates the reversing of a steering direction. (2) In a case of quickly turning the human-powered vehicle 10, the human-powered vehicle 10 readily drifts. This stabilizes the behavior of the human-powered vehicle 10 traveling off-road. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

What is claimed is:

1. A human-powered vehicle control device comprising:
   an electronic controller configured to control a human-powered vehicle component including a motor that assists in propulsion of a human-powered vehicle, the electronic controller being configured to control the human-powered vehicle component in a first control state and a second control state that differs from the first control state, the electronic controller being configured to change the first control state to the second control state upon determining that at least one of a first condition and a second condition is satisfied during the first control state, change the second control state to the first control state upon determining that at least one of a third condition and a fourth condition is satisfied during the second control state, and control the motor so that an upper limit value of an output of the motor is smaller in the second control state than in the first control state, the first condition being satisfied when a first value related to a change rate of a yaw angle of the human-powered vehicle is greater than or equal to a first predetermined value, the second condition being satisfied when a second value related to a change rate of a roll angle of the human-powered value is greater than or equal to a second predetermined value the third condition being satisfied when the first value is less than a third predetermined value, and the fourth condition being satisfied when the second value is less than a fourth predetermined value.

2. The human-powered vehicle control device according to claim 1, wherein the electronic controller is configured to change the second control state to the first control state upon determining that at least one of a fifth condition and a sixth condition is satisfied during the second control state, the fifth condition being satisfied when the yaw angle is less than a first angle, and the sixth condition being satisfied when the roll angle is less than a second angle.

3. The human-powered vehicle control device according to claim 1, wherein the electronic controller is configured to change the second control state to the first control state upon determining that a pitch angle of the human-powered vehicle is less than a second angle in the second control state.

4. The human-powered vehicle control device according to claim 1, wherein the electronic controller is configured to control the motor in accordance with human drive force input to the human-powered vehicle.

5. The human-powered vehicle control device according to claim 4, wherein the electronic controller is configured to control the motor so that a second ratio of an assist force generated by the motor to the human drive force is smaller in the second control state in the first control state.

6. The human-powered vehicle control device according to claim 5, wherein the electronic controller is configured to control the motor so as not to assist in propulsion of the human-powered vehicle in the second control state.

7. The human-powered vehicle control device according to claim 4, wherein the electronic controller is configured to control the motor in a third control state and a fourth control state that differs from the third control state, and the electronic controller is configured to change the third control state to the fourth control state upon determining a pitch angle of the human-powered vehicle or a value related to a second change rate of the pitch angle of the human-powered vehicle is greater than or equal to a third predetermined value and the pitch angle of the human-powered vehicle increases in the third control state.

8. The human-powered vehicle control device according to claim 7, wherein the electronic controller is configured to control the motor so that a second ratio of an assist force generated by the motor to the human drive force is larger in the fourth control state than in the third control state.

9. The human-powered vehicle control device according to claim 4, wherein the electronic controller is configured to control the motor in a fifth control state and a sixth control state that differs from the fifth control state, the electronic controller is configured to change the fifth control state to the sixth control state upon determining an absolute value of a value related to a second change rate of a pitch angle of the human-powered vehicle is greater than or equal to a fourth predetermined value and the pitch angle of the human-powered vehicle decreases in the fifth control state.

10. The human-powered vehicle control device according to claim 9, wherein the electronic controller is configured to control the motor so that a second ratio of an assist force generated by the motor to the human drive force is smaller in a sixth control state than in the fifth control state.

11. The human-powered vehicle control device according to claim 10, wherein the electronic controller is configured to control the motor so as not to assist in propulsion of the human-powered vehicle in the sixth control state.

12. The human-powered vehicle control device according to claim 1, wherein the human-powered vehicle component further includes a transmission that changes a first ratio of a rotational speed of a drive wheel to a rotational speed of a crank of the human-powered vehicle, and the electronic controller is configured to control the transmission so that the first ratio in the second control state is smaller than the first ratio in the first control state.

13. The human-powered vehicle control device according to claim 1, wherein the human-powered vehicle component further includes a transmission that changes a first ratio of a rotational speed of a drive wheel to a rotational speed of a crank of the human-powered vehicle, and the electronic controller is configured to control the transmission so as to change the first ratio in accordance with a travel state of the human-powered vehicle in the first control state and does not control the transmission in accordance with the travel state of the human-powered vehicle in the second control state.

14. The human-powered vehicle control device according to claim 13, wherein the electronic controller is configured to control the transmission so as to change the first ratio upon determining a parameter related to a travel state of the human-powered vehicle shifts from within a predetermined range to outside the predetermined range in the first control state.

15. The human-powered vehicle control device according to claim 14, wherein
the parameter includes at least one of a rotational speed of a crank of the human-powered vehicle and human drive force input to the human-powered vehicle.

16. The human-powered vehicle control device according to claim 1, further comprising
a detector that detects at least one of the yaw angle and the roll angle.

17. The human-powered vehicle control device according to claim 16, wherein
the detector includes a gyroscope.

18. The human-powered vehicle control device according to claim 16, wherein
the detector includes a mount that is mountable on a frame of the human-powered vehicle.

* * * * *